(12) United States Patent
Hubscher

(10) Patent No.: US 6,705,308 B2
(45) Date of Patent: Mar. 16, 2004

(54) PERSONAL HEATING DEVICE

(76) Inventor: Darin Hubscher, R.R.#2, Swan River, Manitoba (CA), R0L 1Z0

( * ) Notice: Subject to any disclaimer, the term of this patent is extended or adjusted under 35 U.S.C. 154(b) by 0 days.

(21) Appl. No.: 10/042,222

(22) Filed: Jan. 11, 2002

(65) Prior Publication Data

US 2003/0131840 A1 Jul. 17, 2003

(51) Int. Cl.[7] ................................................ A61F 7/00
(52) U.S. Cl. ........................ 126/208; 126/94; 126/4
(58) Field of Search ............................... 126/208, 204, 126/9 B, 9 R, 9 A, 93, 43, 94, 25 R, 4, 59

(56) References Cited

U.S. PATENT DOCUMENTS

| | | | | |
|---|---|---|---|---|
| 41,876 A | * | 3/1864 | Upham | 126/208 |
| 619,045 A | * | 2/1899 | Kirkland | 126/208 |
| 2,567,323 A | * | 9/1951 | Cyphert | 126/208 |
| 2,845,924 A | * | 8/1958 | Benda | 126/208 |
| 2,904,031 A | * | 9/1959 | Scott | 126/204 |
| 3,024,782 A | | 3/1962 | Knopps | 126/208 |
| 4,676,223 A | * | 6/1987 | Peterson | 126/208 |
| 4,691,688 A | * | 9/1987 | Urso | 126/208 |
| 4,850,858 A | * | 7/1989 | Blankenship et al. | 126/43 |
| 4,913,126 A | * | 4/1990 | McCall | 126/204 |
| 5,405,186 A | | 4/1995 | Hanson et al. | 126/208 |

FOREIGN PATENT DOCUMENTS

FR 225536 A * 2/1943 ................. 126/208

* cited by examiner

Primary Examiner—Josiah Cocks
(74) Attorney, Agent, or Firm—Adrian D. Battison; Michael R. Williams; Ryan W. Dupuis

(57) ABSTRACT

A personal heating device comprises a container and a heating arrangement within the container for providing heat to the container. The container has a hollow interior, a closable opening and a plurality of ventilation holes on the container. The heating arrangement arranged to fit within the hollow interior of the container has a support arranged to hold a heating element, a vented heat shield located above the heating element arranged to dispense the heat within the container. The closable opening is arranged to receive a seat portion on the container arranged such that the container is used as a seat. The seat portion has a venting chimney which is arranged to direct the heated air within the container directly into the clothing of a user.

6 Claims, 3 Drawing Sheets

US 6,705,308 B2

PERSONAL HEATING DEVICE

FIELD OF THE INVENTION

The present invention relates to a personal heating device, more particularly a heated seat.

BACKGROUND

Many outdoor activities which include ice fishing, hunting and sporting events are held during the winter months. To facilitate the cold weather people must dress accordingly to keep warm. It is found, even though people are dress accordingly for the cool weather, spending long periods of time outdoors in the cold will cause a person to become cold.

Some examples of devices which are arranged to provide heat to a person while outdoors are shown in U.S. Pat. Nos. 3,024,782 (Knopps) and 5,405,186 (Hanson et al).

The Patent of Knopps discloses a seat arranged to contain a heating element, specifically heating canister, which heats the container allowing a person to sit on a heated seat. The heating cansiter is located directly below the seat which would cause the heat to become excessive thereon not providing a comfortable temperature for the seat. The container also discloses a venting arrangement which is arranged to heat the person, the venting arrangement is a plurality of holes which do not allow the person to direct the heat sufficiently therefore losing a lot of the heat.

The Hanson et al Patent also discloses a container arranged to be sat on by a person in the outdoors. The patent discloses a container have a gas container, such as propane or the like, which provides an external fuel for heating the interior of the container. A danger of using a fuel source such as propane from a tank is that if the flame were to be distinguished the gas will continue to flow from the tank into the container which can obviously cause a dangerous situation. Secondly the seat uses a passageway which does not direct the heat sufficiently therefore there may be an unwanted loss of heat.

The above mentioned patents also do not disclose any type of insulation for the container, which may, under some circumstances cause excessive heat loss due to wind.

SUMMARY

According to the present invention there is provided a personal heating device comprising;
  a container having;
  a hollow interior;
  a closable opening;
  a plurality of ventilation holes on the container;
  a heating arrangement arranged to fit within the hollow interior of the container, the heating arrangement having;
  a support arranged to hold a heating element;
  a vented heat shield located above the heating element arranged to dispense the heat within the container; and,
  a seat portion on the container arranged such that the container is used as a seat.

Preferably the closable opening on the container is at a top end thereof.

Conveniently the seat is the cover.

Preferably the heating element uses a flammable liquid.

It is preferred that the liquid is Diethylene Glycol.

Preferably the support is arranged to be located in a bottom end of the container adjacent the ventilation holes such that the heat from the element rises within the container through the heat shield into a top portion of the container above the heat shield.

Conveniently the seat has a chimney which is arranged to be located inside a users apparel such that the heat from the container is vented into the users apparel.

Preferably the heat shield has a plurality of vents spaced radially about a centre portion of the shield for dispersing heated air.

Preferably the centre portion of the heat shield is located directly above the heating element.

BRIEF DESCRIPTION OF THE DRAWINGS

In the accompanying drawings, which illustrate an exemplary embodiment of the present invention.

DETAILED DESCRIPTION

Figure 1:
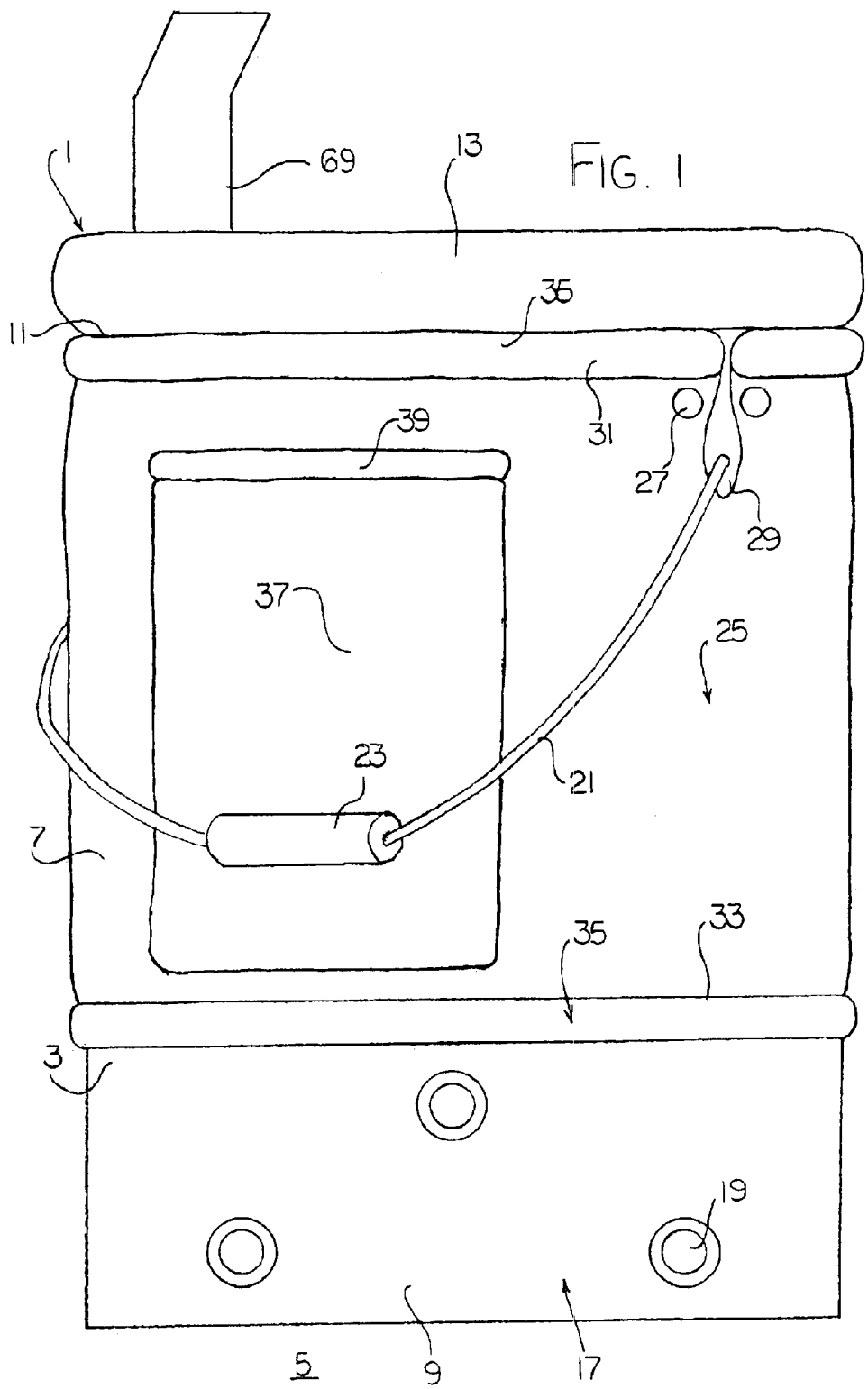
FIG. 1 is a side elevational view of the present invention.

Referring to the accompanying drawings, there is illustrated a personal heating device 1 which is arranged to be used to provide heat to an individual during activities such as ice fishing, hunting and the like. The heating device has a container 3 arranged to sit upright on a supporting surface 5 such as the ground or the like. The container has vertical outer walls 7 extending upwardly from a base 9 to a open top end 11. The open top end is arranged to receive a cover 13 which is designed to be used as a seat. The container has a hollow interior 15 in which a heating device 16 is arranged to be located for heating the air within the container providing heat to the seat. The container has a bottom end 17 which has a plurality of holes 19 spaced around the base on the outer vertical wall. The holes are designed to vent fresh air into the container. In the particular embodiment of the present invention shown in the accompanying drawings, the container is designed from a conventional pail made of metal which the adaptations of the above mentioned aspects. As found on a conventional pail the container has a handle 21 extending from the top end connected on respective sides of the container and is arranged to rotate there on. The handle has a wooden member 23 which is arranged to be engaged by a user while carrying the container.

Wrapped around the container, above the vent holes a below the seat is an insulating jacket 25. The insulating jacket is arranged to insulate the container such that unnecessary heat escapes from the container. Since the container is designed to be used in an outdoor environment, the jacket is designed to stop wind and the cold air from cooling the exterior of the container. The jacket, in this embodiment, is arranged to be slide over the bottom end and be fastened to the container by buttons 27 on the jacket which attach to members on the container. The jacket at the handle has a spacing 29. The top edges 31 and the bottom edge 33 of the jacket has elasticity within an outer lip 35. The jacket, conveniently, has a pocket 37 sewn onto the jacket with an opening 39 such that items can be stored there in.

Figure 2:
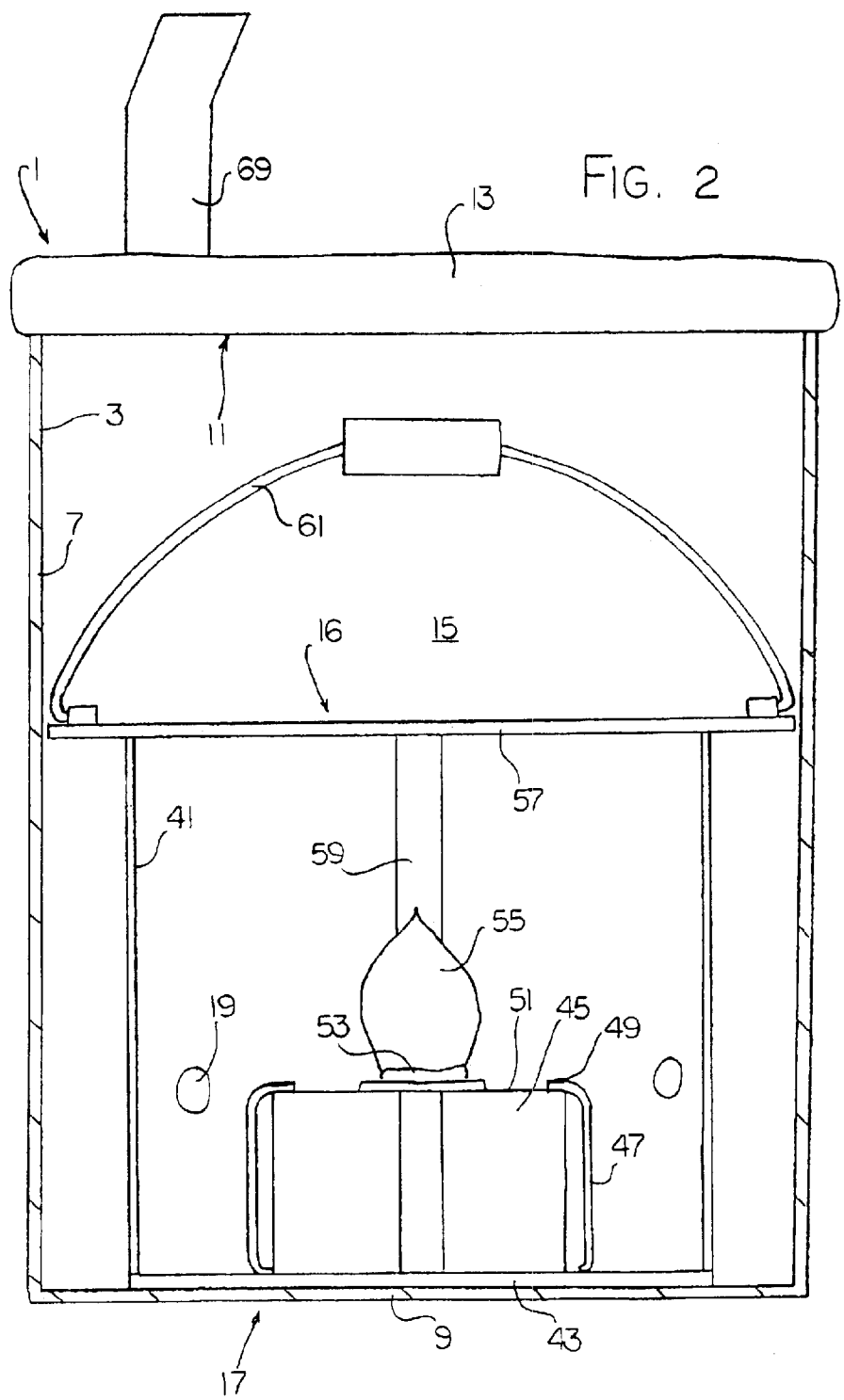
FIG. 2 is a side elevational view of the interior of the present invention.

The heating arrangement, as illustrated in FIG. 2, is arranged to fit within the hollow interior of the container and rest on the base therein. A frame 41 of the heating arrangement has a bottom portion 43 arranged to sit on the base of the container. The bottom portion is arranged to receive a canister 45 of flammable fluid. Canister arms 47 extend upward from the bottom portion from spaced positions about the canister. Top ends of the canister arms have a flange 49 which is arranged to engage a top side 51 of the canister for supporting the canister in place within the frame. The canister has an adjustable wick 53 extending from the top side which is arranged to absorb the liquid within the canister. Lighting of the wick burns the absorbed liquid to produce a flame 55 which is used to heat the air within the hollow interior. The liquid within the canister is Diethylene Glycol.

A heat plate 57 is positioned above the canister to distribute the heat emitted from the flame. The heat plate is mounted on plate arms 59 which extend upward from the bottom portion of the frame. The arms support the heat plate above the vent hole such that the vented air pushes the heat upwards. The heat plate has a handle 61 which has a wooden member for engagement by the user to remove and replace the frame.

Figure 3:
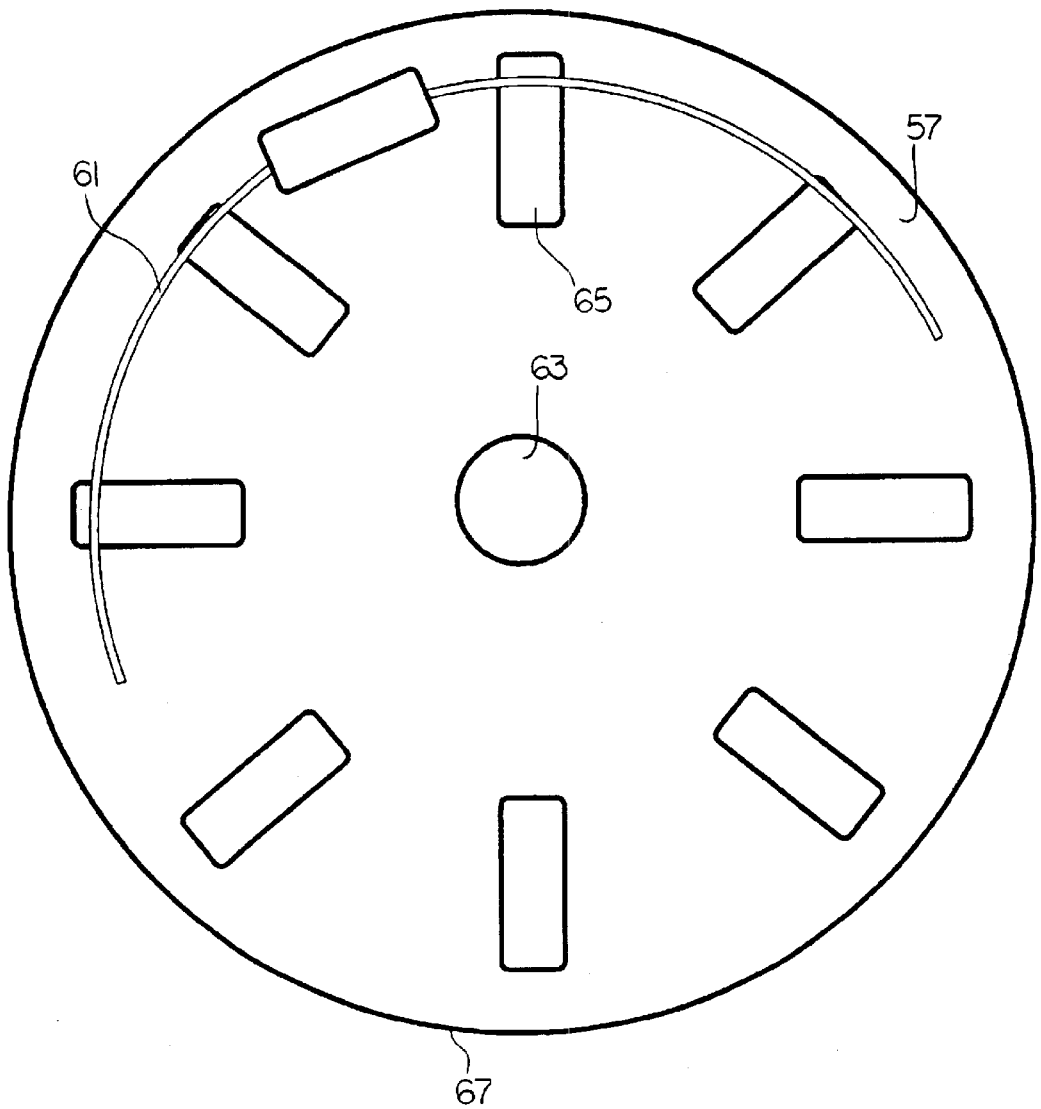
FIG. 3 is a top plan view of the heat plate of the present invention.

As best illustrated in FIG. 3, the heat plate has a centre portion 63 which deflects the heat directly from the flame. Positioned radially about the centre portion are release vents 65 which allow the heated air to escape into upper region of the hollow interior which is surrounded by the insulating jacket. The upper region holds the heat such that the container is heated providing a heated seat for a user. The vented air pushes the heated air up through the release vents into the upper region. The upper region can also be used as a method of heating food or liquid such as wieners for hot dogs or hot chocolate. The heat plate is sufficiently sized such that an outer edge 67 fits snugly within the hollow interior so that the heated air is directed only by the release vents.

The seat has a chimney 69 which is arranged to provide a vent for releases the heated air into a jacket of a user. The seat is designed such that the user can sit on the seat and aim the chimney into the users jacket so that the heated air flows into the users jacket keeping the user warm in the process.

While one embodiment of the present invention has been described in the foregoing, it is to be understood that other embodiments are possible within the scope of the invention. The invention is to be considered limited solely by the scope of the appended claims.

What is claimed is:

1. A personal heating device comprising:
    a container having;
        an outside wall of the container, having a peripheral wall with an inside surface and a bottom wall defining a hollow interior;
        a closable opening on a top end of the container;
        a plurality of ventilation holes on the outside wall of the container;
    a heating arrangement being arranged to removeably sit on the bottom wall within the hollow interior of the container, the heating arrangement having;
        a support arranged to hold a heating element on the bottom wall with the heating element exposed to the inside surface of the container;
        a vented heat shield mounted on the support located above the heating element arranged to disperse the heat within the container, the vented heat shield being sized to fit snugly to the inside surface of the peripheral wall of the container; and,
        a seat portion on the outside wall of the container at the closable opening arranged such that the container is used as a seat.

2. The device according to claim 1 wherein the heating element uses a flammable liquid.

3. The device according to claim 2 wherein the liquid is Diethylene Glycol.

4. The device according to claim 1 wherein the seat portion has a chimney which is arranged to be located inside a users apparel such that the heat from the container is vented into the users apparel.

5. The device according to claim 1 wherein the heat shield has a plurality of vents spaced radially about a centre portion of the shield for dispersing heated air.

6. The device according to claim 5 wherein the centre portion of the heat shield is located directly above the heating element.

* * * * *